(12) United States Patent
Major et al.

(10) Patent No.: US 9,601,153 B2
(45) Date of Patent: Mar. 21, 2017

(54) SYSTEMS AND PROCESSES FOR EFFICIENTLY STORING AND RETRIEVING VIDEO CONTENT

(71) Applicant: ECHOSTAR TECHNOLOGIES L.L.C., Englewood, CO (US)

(72) Inventors: Robert Drew Major, Orem, UT (US); Darren Major, Pleasant Grove, UT (US); John Michael Paul, Palo Alto, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/788,312

(22) Filed: Jun. 30, 2015

(65) Prior Publication Data

US 2016/0012843 A1    Jan. 14, 2016

Related U.S. Application Data

(60) Provisional application No. 62/018,839, filed on Jun. 30, 2014.

(51) Int. Cl.
*G11B 5/02* (2006.01)
*G11B 20/10* (2006.01)
*G11B 5/012* (2006.01)
*H04N 5/781* (2006.01)
*G11B 20/12* (2006.01)

(52) U.S. Cl.
CPC ........ *G11B 20/10527* (2013.01); *G11B 5/012* (2013.01); *G11B 5/02* (2013.01); *G11B 20/1217* (2013.01); *H04N 5/781* (2013.01); *G11B 20/1258* (2013.01); *G11B 2020/10898* (2013.01); *G11B 2020/1294* (2013.01)

(58) Field of Classification Search
None
See application file for complete search history.

(56) References Cited

U.S. PATENT DOCUMENTS

| | | | | |
|---|---|---|---|---|
| 4,604,687 | A * | 8/1986 | Abbott | .................. G11B 5/012 |
| 5,719,983 | A * | 2/1998 | Henderson | ............ G06F 3/0601 |
| | | | | 348/E7.073 |
| 6,795,894 | B1 | 9/2004 | Neufeld et al. | |
| 2008/0098051 | A1* | 4/2008 | Blacquiere | ......... G11B 20/1217 |
| 2014/0165116 | A1 | 6/2014 | Major et al. | |

* cited by examiner

*Primary Examiner* — Brian Butcher
(74) *Attorney, Agent, or Firm* — LK Global

(57) ABSTRACT

Methods, systems and devices are described to improve the storage and retrieval of video content. The general concepts set forth herein could be used in any video storage system that uses disk drives to store video content, including remote or local storage digital video recorders (DVRs) and the like.

14 Claims, 3 Drawing Sheets

SYSTEMS AND PROCESSES FOR EFFICIENTLY STORING AND RETRIEVING VIDEO CONTENT

PRIORITY CLAIM

This application claims priority to U.S. Provisional Patent Application Ser. No. 62/018,839, which was filed on Jun. 30, 2014 and is incorporated herein by reference.

TECHNICAL FIELD

The present disclosure generally relates to file systems for storing data in a digital computer. More particularly, the following discussion relates to file systems and associated processes for efficiently storing large amounts of video content, as in a remote storage digital video recorder (RS-DVR) or the like.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, local storage and/or remote storage digital video recorder (LSDVR and/or RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate) for increased or decreased quality, as desired. Adaptive media streaming typically relies upon the media player client to control much of the streaming process. That is, the media player client, rather than the server, typically determines the next segment of the stream that will be requested and delivered to the player. Several examples of adaptive streaming systems, devices and techniques are described in US Patent Publication No. 2008/0195743, which is incorporated herein by reference as one example of an adaptive media streaming system.

Various server systems and processes have been developed to store and retrieve encoded video data DVRs, video servers and/or the like. US Patent Publication 2014/0165116, for example, is incorporated herein by reference to show examples of file systems and associated processes that can be used with RSDVR systems. There is still a desire, however, to improve the performance of RSDVRs, LSDVRs and other data storage intensive applications.

It is therefore desirable to create systems, devices and processes that allow the efficient storage and retrieval of video content in an LSDVR, RSDVR, video server or the like. These and other desirable features and characteristics will become apparent from the subsequent detailed description and the appended claims, taken in conjunction with the accompanying drawings and this background section.

BRIEF DESCRIPTION

The following discussion relates to various example implementations of systems, devices and processes that can efficiently store and retrieve video or other content from one or more disk drives. These concepts may be used in digital video recorders, remote storage video recorders, video on demand services, or other applications as desired.

Some implementations provide DVR or similar disk-based systems to manage storage of video content. The system suitably comprises an interface configured to receive the video content, a disk drive configured to store the video content on a spinning disk having an inner portion and an outer portion, and a processor. The processor is programmed or otherwise configured to control the reception of the video content via the interface and to direct the storage of the received video content on the disk drive. More particularly, the processor is programmed or otherwise configured during a peak demand period to direct the storage of the received video content along the outer portion of the spinning disk. During an off-peak demand period, the processor is programmed or otherwise configured to direct the transfer of video content stored along the outer portion of the spinning disk to the inner portion of the spinning disk so that the outer portion retains contiguous available storage space at the beginning of a subsequent peak demand period.

Other embodiments provide a computer-implemented process to manage storage of video content on a disk drive having a spinning disk comprising an inner portion and an outer portion. The process suitably comprises receiving the video content; during a peak demand period, directing the storage of the received video content along the outer portion of the spinning disk; and during an off-peak demand period, directing the transfer of video content stored along the outer portion of the spinning disk to the inner portion of the spinning disk so that the outer portion retains contiguous available storage space at the beginning of a subsequent peak demand period.

Still other embodiments provide a method executed by a disk controller or other processor to control a disk drive that stores digital data on a disk. The method suitably comprises receiving the digital data for storage on the disk drive; initially directing the storage of the received digital data along an outer region of the disk; subsequently directing the transfer of the received digital data from the outer region of the disk to an inner region of the disk; and responding to a subsequent request for the received digital data by reading the digital data from the inner region of the disk.

Still other embodiments provide additional processes, systems and devices for managing file storage on a disk drive. The examples presented in this summary may be modified or augmented in any manner, and many additional examples are described below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an example remote storage digital video recorder (RSDVR) system;

DETAILED DESCRIPTION

Figure 1:
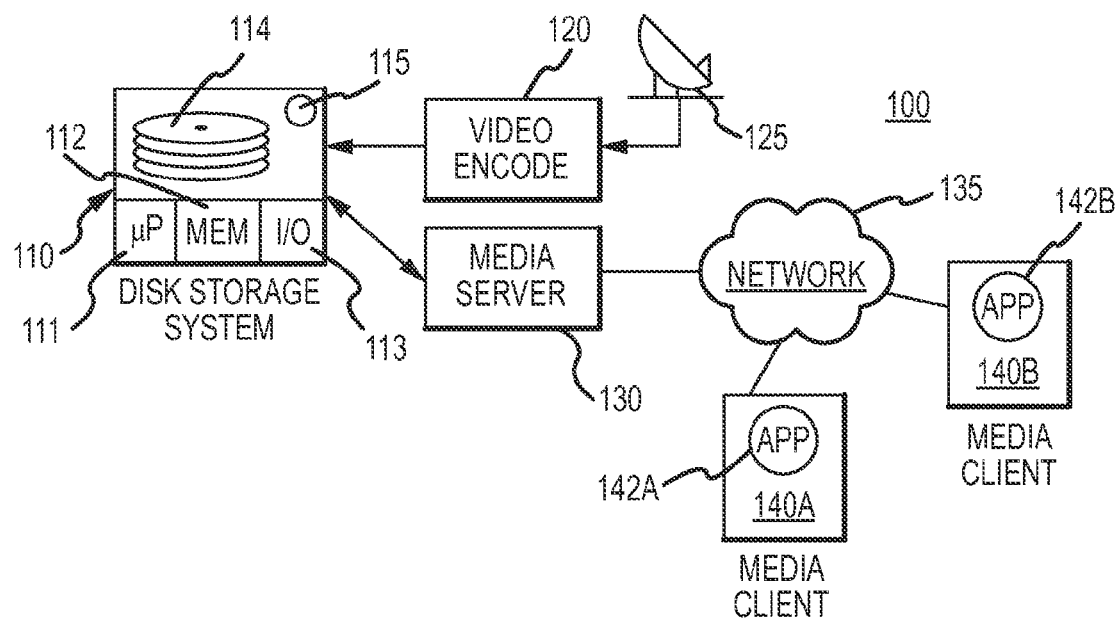

The following detailed description of the invention is merely exemplary in nature and is not intended to limit the invention or the application and uses of the invention. Furthermore, there is no intention to be bound by any theory presented in the preceding background or the following detailed description.

In a typical digital video recorder (DVR), much more data is written than read. That is, most recorders store a substantial amount of video content that is never retrieved for viewing. This is especially true in an adaptive video delivery system in which multiple copies of each program are encoded at various qualities so that the media player is able to adaptively request segments at video encoded at a desired quality or bandwidth. In a typical adaptive rate RSDVR, for example, content is often encoded at 5-10 (or more) different quality levels, even though the video content is only retrieved and viewed at one level.

Moreover, most recording and viewing of video content occurs in a relatively short time period, often in the evening hours of the day. This period of time, often referred to as "prime time", simply represents a period of time during the day in which the recorder is busiest due to a higher volume of recording and/or viewing. During "prime time", the recorder is often operating at its peak load, so it is typically desirable to maximize the amount of data that can be transferred to the drive during this time.

Further, due to the nature of conventional hard disk drives, it is faster to write data to the outer edge of the disk than to the inside region. This is because the write head of the disk comes into contact with a larger surface area at the outer edge of a spinning disk than at the inner edge as the disk spins at a fixed angular rate. In practice, most conventional disk drives can store data about twice as fast at the outer edge than they can at the inner edge. Moreover, hard disks typically function more efficiently when they are given operations that access sequential areas of the disk. That is, back to back operations can typically be performed with little or no pausing, thereby allowing faster operation in comparison to moving the disk head from one region to another. The hard disk therefore operates most efficiently when it is performing sequential input/output operations toward the outer regions of the disk.

A more efficient file system, then, is designed so that during "prime time" or other periods of peak demand the disk spends as much time as possible performing sequential back-to-back writes on the outer portion of the disk. To accomplish this, the file system can be designed to move data from the outer portion of the disk to the slower inner portion during non-peak times. This ensures that the faster outer portion is kept clear for the next peak load time. During peak loads, then, the drive sequentially writes on the outside of the disk until it is interrupted to perform a read operation.

Moreover, read operations can be designed to use read ahead techniques to predictively read large chunks of data from the disk (e.g., 2-10 seconds). The data read from the disk can be cached in memory until it is delivered to the requesting party. Multiple reads (including reads for different video streams) can also be delayed or combined so that interruptions to the outer-region writing are minimized. By encouraging contiguous outer-region writing and minimizing interruptions for read operations, the overall efficiency of the drive can be greatly enhanced during periods of peak operation.

During off-peak times, the outside part of the disk is cleaned and cleared up by moving data to the inner portion of the disk so that the disk is prepared for future peak load times. Any recordings made during non-peak time can be stored on the inner portion of the disk, thereby keeping the outer portion free until peak time. As recordings time out (e.g., due to automatic time out, active user deletion, passive user deletion, etc.) the space created by the deleted recordings can be re-used, and/or the disk can be further cleaned so that files are stored contiguously, thereby further minimizing movement of the disk head during read operations.

Turning now to the drawing figures, FIG. 1 shows an example of a remote storage DVR (RSDVR) system 100 that uses disk storage system 110 to store video content for delivery to one or more media client systems 140A-B executing media player applications 142A-B (respectively). As illustrated in FIG. 1, RSDVR system 100 suitably includes a disk storage system 110, a video encoder 120 and a media server 130. Generally speaking, video encoder 120 receives video content 125 from a satellite, fiber optic, cable or other source and encodes the received content into a format that is suitable for storage and transmission over network 135. In various embodiments, encoder 120 is an adaptive encoder that encodes television or other video content into one or more copies. Media server 130 could represent any sort of conventional file, stream or other content server that is compatible with network 135. Media server 130 could be implemented in some embodiments with a conventional content delivery network (CDN) that delivers segment files in response to conventional HTTP or other constructs.

In an exemplary embodiment, encoder 120 encodes the received content 125 into multiple sets of media segments that are commonly indexed in time but that have different encoding parameters (bit rate, frame rate, resolution, etc.) to support delivery and playback of streams that consume different amounts of bandwidth. Although each of the components are drawn separately in FIG. 1, equivalent embodiments could combine some of all of the features of system 100 into a common computing system having one or more processors. Other embodiments could separate the various functions across any number of different computing systems and processors, including any number of cloud services.

Disk storage system 110 is a computer system based upon any conventional computing hardware such as processor 111, memory 112 and input/output interfaces 113. Interfaces 113 may include network (e.g., IEEE 802.11 or 802.14), bus or other interfaces for receiving encoded video content from encoder 120 and for providing requested video to media server 130. In various embodiments, disk storage system is a rack-mounted system that operates within a data center or the like; other embodiments could implement disk storage system 110 within a personal computer, set top box, or other electronic device.

Disk storage system 110 suitably executes a control application 115 that performs the various functions associated with a file system. Application 115 may be stored as software, firmware or the like in memory 112 for execution by processor 111 in an exemplary embodiment.

Disk storage system 110 may support any number of disk drives 114 for storage and retrieval of video content. In various embodiments, each disk drive 114 includes a spinning disk with a read/write head that is capable of storing digital data, often through application of conventional electromagnetic techniques. As noted above, such disks typically write data more quickly when contiguous blocks are available, particularly along the outer diameter of the spinning disk. Hence, the faster outer regions of the disk can be cleared on a daily or other temporal basis to ensure their availability during periods of peak demand (e.g., "prime time" for video recording).

Figure 2:
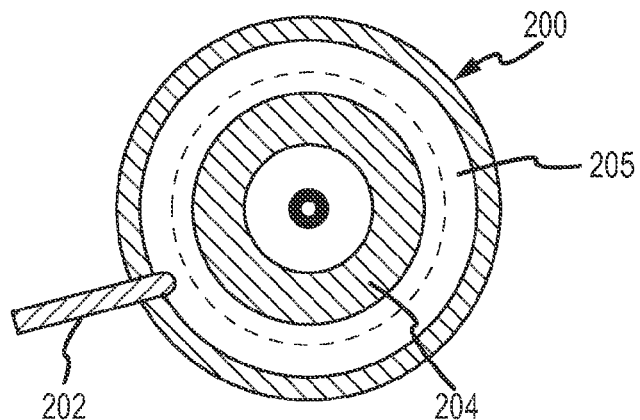
FIG. 2 is a diagram of an example disk with storage split between an outer portion and an inner portion.

FIG. 2 shows an example of a disk 200 in which data is written by a read/write head 202 along an outer region 205 during a period of peak demand. As time becomes available (e.g., when peak demand is over or whenever the read/write head 202 is otherwise available), the data written to the outer region 205 can be transferred to the inner region 204 for subsequent retrieval and to ensure that the faster and more efficient outer region 205 remains clear for subsequent periods of heavy use. The division between "inner region 204" and "outer region 205" is drawn somewhat arbitrarily in FIG. 2 for ease of illustration. In a practical embodiment, the inner region 204 is typically the region of the disk 200 that is closest to the center, whereas outer region 205 is closest to the outer diameter. As data is written to the disk, the two regions 204 and 205 may grow towards each other until newly-written content in the outer region 205 can be transferred to the inner region 204 for longer-term storage.

As noted above, the disk write head 202 comes into contact with a greater portion of the outer periphery of disk 200 than the inner periphery for a given period of time. This is because the constant angular rotation involves greater linear movement of the outer region 205 than the inner region 204 of the disk. This makes the outer region 205 more efficient for fast storage, while leaving the inner region 204 free for longer-term storage. Additionally, transferring data from the outer region 205 to the inner region 204 presents the opportunity to defragment or otherwise reorganize the data to thereby place contiguous portions of files in spatial continuity within the inner region 204. That is, fast writing may distribute portions of files into disjointed locations, particularly if the disk 200 is simultaneously writing multiple files. When these files are re-written to the inner portion 204, the different portions of the files can be re-written in contiguous order, thereby making subsequent read operations more efficient. If relatively large portions of files are stored contiguously, then the read/write head 202 only needs to move a very small distance to process multiple reads of the file. This can make reads much more efficient, particularly if additional portions of the file are "read ahead" and stored in a buffer for subsequent processing. This would allow the read/write head 202 to be used much more efficiently because once the head 202 is in position, it is able to provide more useful data than was previously available. By increasing the amount of data read while the read/write head is in position, the efficiency of the read process can be greatly improved.

Figure 3:
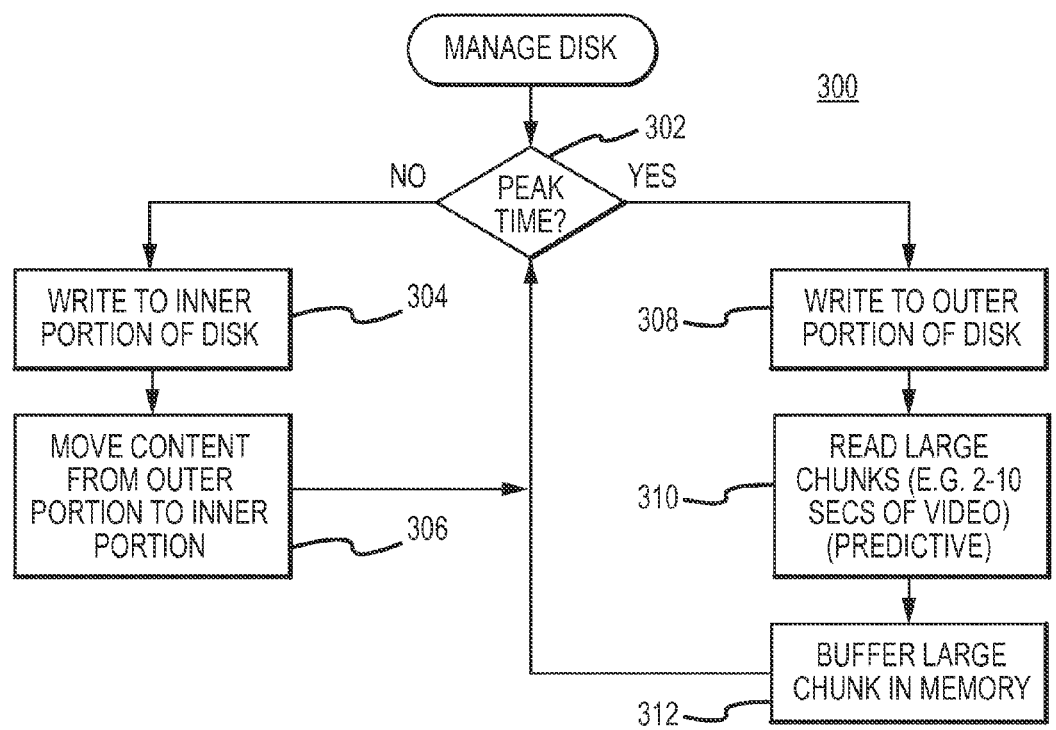
FIG. 3 is a flowchart of an example process for managing the storage and retrieval of data using a disk drive.

FIG. 3 shows an example process 300 in which the operation of disk drive 114 can be managed through efficient allocation of regions 204 and 205 of disk 200. The various functions shown in FIG. 3 may be implemented within a file system control application 115 or the like executed by disk storage system 110. Other embodiments may execute some or all of the functions shown in FIG. 3 with different hardware or using other techniques.

As noted above, process 300 manages the disk operations differently during periods of peak and non-peak demand (function 302). Peak times may be defined in any manner. In some embodiments, peak times may correspond to known time periods in which television viewing and/or recording are known to be most popular (e.g., "prime time" is generally considered to be 8-11 pm Eastern and Pacific, 7-10 pm Central and Mountain time, although other embodiments may define "prime time" to include additional time, less time, or even entirely different times). In other embodiments, peak times are defined through actual use. That is, if the drive is observed to be highly utilized at a particular time, that time could be considered a "peak" time even though the time may not correspond to traditional "prime time" hours. A particular user may keep non-traditional viewing hours, for example, or may have an interest in particular programming that is broadcast during hours other than "prime time". The particular peak times considered in function 302 may therefore be regularly-occurring times in some implementations, and/or times that are identified though actual use as desired.

During times of peak demand, received content is written to the outer portion of the disk (function 308). As noted above, the write head comes into contact with more disk blocks on the outer portion of the disk during a fixed period of time in comparison to the inner portion of the disk. This faster operation allows for faster write operations during the times that the disk is in greatest demand. Note that some embodiments could initially write all of the received data to the outer portion 205 of disk 200, even if the data is received during a non-peak time, for more consistent processing. If sufficient time is available for inner region writing (function 304), however, other embodiments may make use of this time as desired.

The write operations may be further optimized at least during peak times by aggregating read operations, as appropriate (function 310). Read operations may be aggregated from different video streams, for example, and/or future read operations may be predicted based upon past read instructions. If process 300 receives a request for a particular data segment having a particular encoded quality, for example, process 300 may predict that a subsequent request for the next data segment in that same stream is likely to be received in the near future. To anticipate this request, it may be beneficial in some implementations to "read ahead" and request the future segment even though the request has not yet been received. This is particularly beneficial if the subsequent segment is physically stored in contiguous disk blocks with the requested segment, since the read head 202 is already positioned very near the proper location on disk 200 for reading the next video segment. Again, read operations can be consolidated or aggregated in any manner. Read requests may be aggregated between different video streams, augmented with predicted read requests, or otherwise aggregated so reduce the interruptions to the write process and/or to reduce movement of the read/write head 202, as desired.

Data read from the disk 200 is buffered in memory (function 312) as desired. Data may be buffered in memory 112 (FIG. 1) in some embodiments, or in separate memory associated with disk storage system and/or media server 130, as desired. Subsequent read requests received from media players 142A-B can then be quickly processed from the memory, without a need for additional access to the spinning disk 200 or additional movement of the disk read/write head 202.

During off-peak times, the outer portion 205 of the disk 200 is kept clear so that the outer portion 205 retains contiguous available storage space at the beginning of a subsequent peak demand period. To that end, some embodiments will write video content received during off-peak times directly to the inner portion 204 of disk 200 (function 304). Alternatively, all received content (including content received during off-peak times) could be initially written to the outer portion 205 of disk 200, and then transferred to the central portion during a subsequent step 306, as desired.

As noted above, content stored on the outer portion 205 of disk 200 is copied to the inner portion 204 as time allows (function 306). This ensures that the fastest writing space is available when the disk 200 is in greatest demand, thereby providing a very efficient disk operating scheme. The moving function 306 may be implemented in any manner; various embodiments could simply read some or all of the data from outer portion 205 into a memory, buffer or other temporary storage and then write the data from the temporary storage to the inner portion, as desired.

Function 306 may further include defragmenting or other organizing of data stored on disk 200 to provide even better optimization of read times. Defragmenting and/or organizing of segment data can be performed after content has been automatically and/or manually deleted to make more efficient use of free space on the disk 200, as desired. Defragmenting may occur by processing links or pointers contained within the stored data, by consulting a file allocation table (FAT) that describes the locations of data associated with particular files, and/or in any other manner.

The process shown in FIG. 3 is one example that could be modified in many different ways. As noted above, peak times may occur at certain identified times (e.g., "prime time" or other hours of the day/week/month/year), or on an as-needed basis. An equivalent embodiment could, for example, write all received data to the outer region 205 of disk 200 as it is received, and then transfer previously-written data from the outer region 205 to the inner region 204 as time becomes available. Many other embodiments could be fashioned in any number of equivalent variations.

Figure 4:
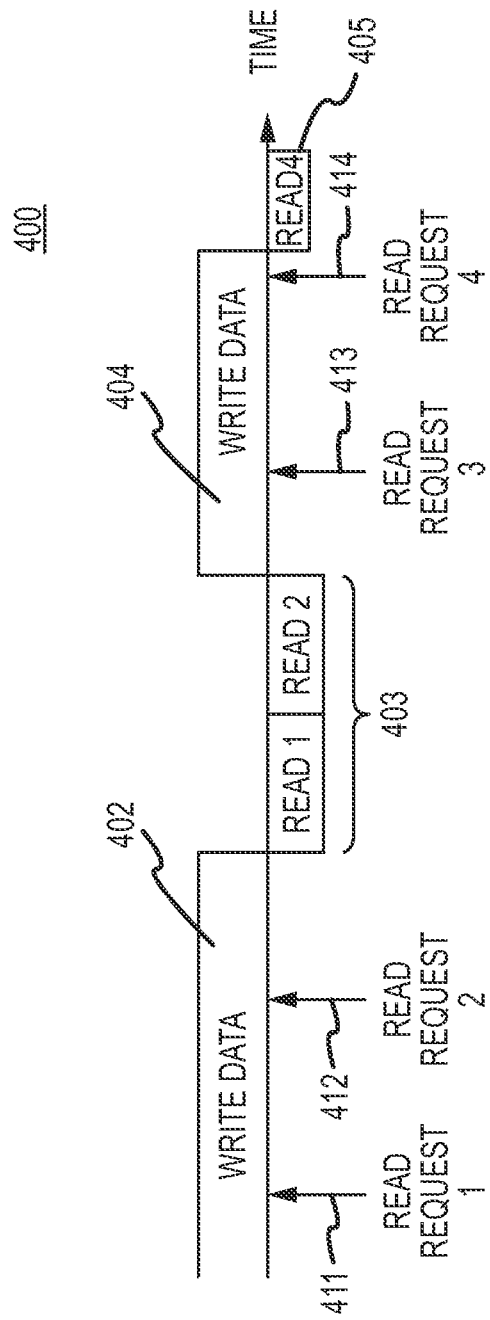
FIG. 4 is a diagram showing an example of a disk read and write timing sequence.

FIG. 4 shows a timing diagram 400 of example operations of process 300 occurring during a peak demand period. In this example, video data is written to the outer region 205 of disk 200 during time periods 402 and 404. As read requests 411-414 are received, the write operations are temporarily interrupted. These interruptions, however, can be combined and/or predictively enhanced so that their effects upon the write process are substantially reduced. As an example, read requests 411 and 412 for two different video segments are received during write period 402. File system 115 suitably responds to the requests 411 and 412 during period 403. In this example, period 403 combines the read operations indicated by requests 411 and 412 to minimize movement of the disk head 202 and to prevent additional interruptions to the write process.

Moreover, various embodiments may predict additional segments that are likely to be requested in the near future. These predicted requests could be combined into period 403 so that the predicted segments are read along with the actually-requested segments. This is particularly efficient if the segments of the video stream are stored relatively contiguously on disk 200, thereby further reducing movement of the mechanical drive head 202. In various embodiments, several segments of the same segment family (e.g., subsequent segments of the same video quality) can be read and buffered in memory, thereby eliminating the need to interrupt the write process for subsequent read requests. In one embodiment, one to five future video segments (corresponding to two to ten seconds of video content) could be predicted and buffered, although other embodiments could equivalently obtain any number of segments representing any amount of video content.

To continue the example of FIG. 4, read period 403 will typically obtain the segments requested by requests 411 and 412, as well as any predicted segments associated with these requests. If a subsequent read request 413 requests one of the predicted and buffered segments, then the requested segment can be delivered from the buffer without additional interruption of the head 202. Any requests 414 for different segments can be processed during a subsequent read period 405, as desired.

Read periods (e.g., periods 403, 405) may be scheduled in any regular or irregular manner. Various embodiments could implement read periods 403, 405 as interrupts, as regularly-scheduled interrupts (e.g., every half second or so in one example), or in any other manner.

The concepts set forth above are particularly well-suited for video recorders and RSDVR systems in which a large amount of data is written relative to the amount that is read, and in which certain time periods (e.g., "prime time") are busier than other times. Equivalent concepts may be readily applied to other data storage applications other than video storage. These concepts may be applied in data warehousing or business intelligence settings, for example, as well as in home entertainment or personal computing settings.

The various concepts set forth herein may be readily applied to large or small disk arrays for further efficiency and optimization. Data warehouse systems, content delivery networks, cloud storage systems and/or any other systems that make use of multiple disk drives could make use of the concepts described herein on some or all of their drives for greatly improved performance.

The foregoing discussion therefore considers several different systems, devices and processes/methods to improve the storage and retrieval of digital content on a disk drive. These general concepts may be expanded or modified as desired to create any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is presently claimed is:

1. A system to manage storage of video content, the system comprising:
    an interface configured to receive the video content;
    a disk drive configured to store the video content on a spinning disk having an inner portion and an outer portion; and
    a processor configured to control the reception of the video content via the interface and to direct the storage of the received video content on the disk drive, wherein the processor is configured:
        during a peak demand period, to direct the storage of the received video content along the outer portion of the spinning disk;
        during an off-peak demand period, to direct the transfer of video content stored along the outer portion of the spinning disk to the inner portion of the spinning disk so that the outer portion retains contiguous available storage space at the beginning of a subsequent peak demand period; and
        to process reads of the video content during at least the peak demand period by aggregating multiple read operations into a single read session, and wherein at least one of the read operations is a predicted read operation that predicts a future read operation that has not yet been received based upon a previously-received read operation.

2. The system of claim 1 wherein the processor is further configured to direct the storage of the received video content along the inner portion of the spinning disk during the off-peak demand period.

3. The system of claim 1 wherein the system further comprises a memory and wherein the video content obtained during the single read session is buffered in the memory.

4. The system of claim 1 wherein the system further comprises a memory and wherein the video content obtained during the single read session is buffered in the memory until a future read operation is received.

5. A computer-implemented process to manage storage of video content on a disk drive having a spinning disk comprising an inner portion and and outer portion, the process comprising:
   receiving the video content;
   during a peak demand period, directing the storage of the received video content along the outer portion of the spinning disk;
   during an off-peak demand period, directing the transfer of video content stored along the outer portion of the spinning disk to the inner portion of the spinning disk so that the outer portion retains contiguous available storage space at the beginning of a subsequent peak demand period; and
   processing reads of the video content during at least the peak demand period by aggregating multiple read operations into a single read session, and wherein at least one of the read operations is a predicted read operation that predicts a future read operation that has not yet been received based upon a previously-received read operation.

6. The process of claim 5 further comprising storing the received video content along the inner portion of the spinning disk during the off-peak demand period.

7. The process of claim 5 wherein the video content obtained during the single read session is buffered in a memory.

8. The process of claim 5 wherein the video content obtained during the single read session is buffered in a memory until a future read operation is received.

9. A method executed by a processor to control a disk drive that stores digital data on a disk, the method comprising:
   receiving the digital data for storage on the disk drive;
   initially directing the storage of the received digital data along an outer region of the disk;
   subsequently directing the transfer of the received digital data from the outer region of the disk to an inner region of the disk; and
   responding to a subsequent request for the received digital data by reading the digital data from the inner region of the disk, wherein the reading of the digital disk comprises aggregating multiple read operations into a single movement of a read/write head of the disk drive, and wherein at least some of the read operations are predicted read operations that have not yet been requested, and wherein the digital data is stored in a buffer until additional requests for the digital data are received.

10. The method of claim 9 wherein the outer region of the disk is closer to the outer periphery of the disk than the inner region so that angular rotation of the disk places the read/write head of the disk drive into contact with a greater linear portion of the outer region of the disk than of the inner region of the disk.

11. The method of claim 10 wherein the storage of the received digital data is initially directed along the outer region of the disk during a period of relative peak demand for the disk.

12. The method of claim 11 wherein the received digital data is transferred from the outer region of the disk to the inner region of the disk during a period of non-peak use of the disk drive.

13. The method of claim 12 wherein the transfer of the received digital data from the outer region of the disk to an inner region of the disk comprises defragmenting the received digital data so that data streams are stored contiguously on the inner region of the disk.

14. The method of claim 11 wherein the reading of the digital disk during the period of relative peak demand comprises aggregating multiple read operations into a single read session.

\* \* \* \* \*